(No Model.)

W. C. SMITH.
SPRING TIRE.

No. 479,851.  Patented Aug. 2, 1892.

Witnesses
Samuel Ker,
Philip C. Masi.

Inventor
Wm C. Smith
by E. W. Anderson
his Attorney

UNITED STATES PATENT OFFICE.

WILLIAM C. SMITH, OF GOSHEN, INDIANA.

SPRING-TIRE.

SPECIFICATION forming part of Letters Patent No. 479,851, dated August 2, 1892.

Application filed September 4, 1891. Serial No. 404,759. (No model.)

*To all whom it may concern:*

Be it known that I, WILLIAM C. SMITH, a citizen of the United States, and a resident of Goshen, in the county of Elkhart and State of Indiana, have invented certain new and useful Improvements in Spring-Tires; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
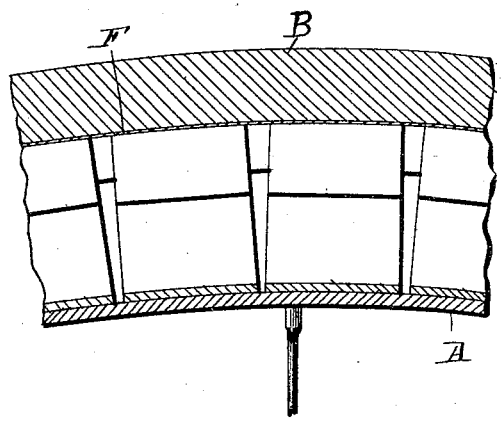
Figure 2:
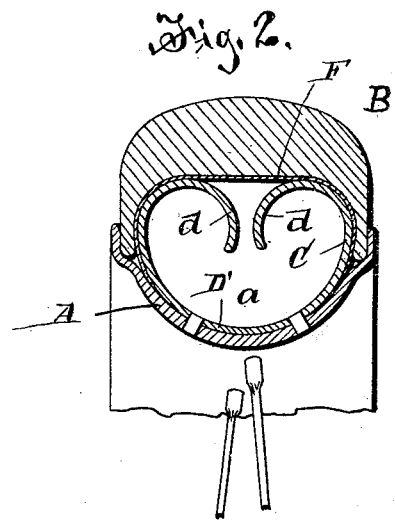
Figure 3:
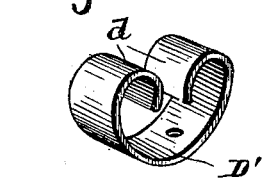

Figure 1 of the drawings is a vertical longitudinal section partly broken away. Fig. 2 is a vertical transverse section, and Fig. 3 is a sectional detail view in perspective of the spring or cushion.

This invention has relation to tires for cycles and other vehicles; and it consists in the novel construction and combination of parts, as hereinafter specified.

The object of the invention is to provide an elastic tire for the purpose of overcoming vibration.

In the accompanying drawings, the letter A designates the felly, and B the tire, which may be of any suitable elastic or flexible material. The felly is preferably provided with a circumferential groove $a$ to receive the tire and springs or cushions C, which are interposed between said felly and tire. These springs may be of any suitable form—such as spiral, flat, oval, looped, or coiled—or may be of the form shown in Fig. 3. This form consists of a spring-metal plate bent into semicircular form and having its free ends $d$ $d$ turned inwardly and downwardly. The bow portion $D'$ of the spring rests and is suitably secured in the concave groove or seat $a$ in the felly, receiving the under surface of the tire in its upper portion.

F designates a band or belt of suitable material, which may be interposed between the springs or cushions and the under surface of the tire for the purpose of uniting the action of the springs to diffuse pressure or jar. The side edges of this band or belt, which is of somewhat flexible material, are curved downwardly into the groove or seat formed in the felly and partially underneath the springs, which serves to retain it in place and also enables it to receive the entire bearing-surface of that portion of each spring which seats against the tire.

Having described this invention, what I claim as new, and desire to secure by Letters Patent, is—

1. The combination, with an elastic tire having a concave inner face and with the felly having a groove or seat therein, of a series of springs interposed between said felly and tire and seating in the concavity of the latter and in the groove or seat of the former, and a band or belt of flexible material within the concavity of the tire and extended downwardly into the seat of the felly at its side edges, substantially as specified.

2. The combination, with the felly and an elastic tire secured thereto, of a series of springs interposed between said tire and felly, said springs consisting each of a metal plate bent into semicircular form and having its free ends bent inwardly and downwardly, and a flexible band or belt within the concavity of the tire for the purpose of equalizing the action of said springs, said band bearing against the end portions of the springs, substantially as specified.

In testimony whereof I affix my signature in presence of two witnesses.

WILLIAM C. SMITH.

Witnesses:
JACOB H. KINDIG,
FRANCIS E. BAKER.